G. R. KREBS & J. W. MORGAN.
COMPUTING SCALE.
APPLICATION FILED NOV. 23, 1914.
1,148,100.
Patented July 27, 1915.
2 SHEETS—SHEET 1.
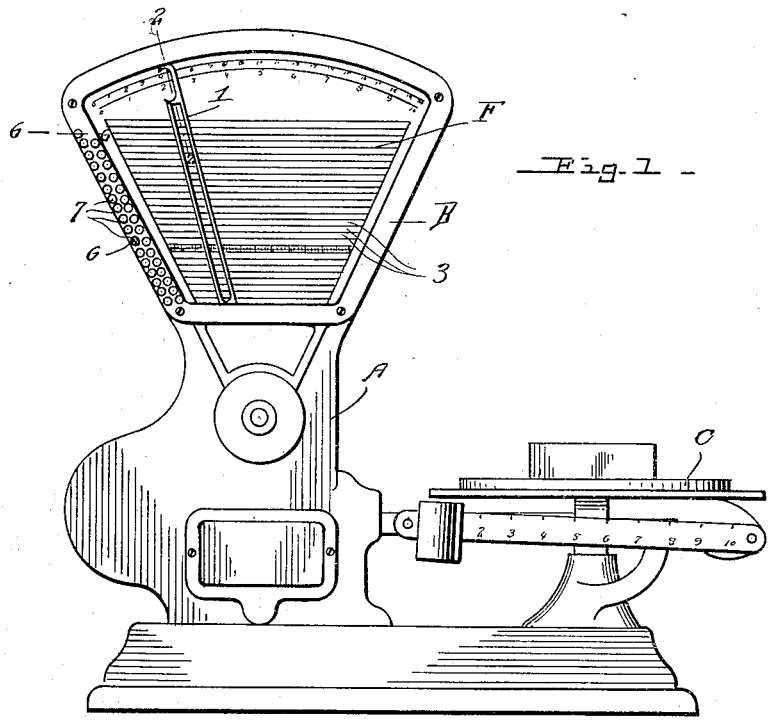
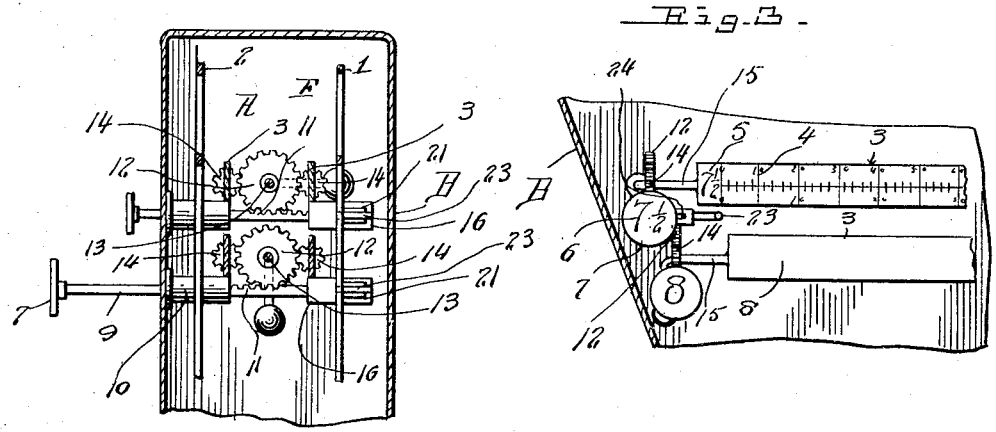

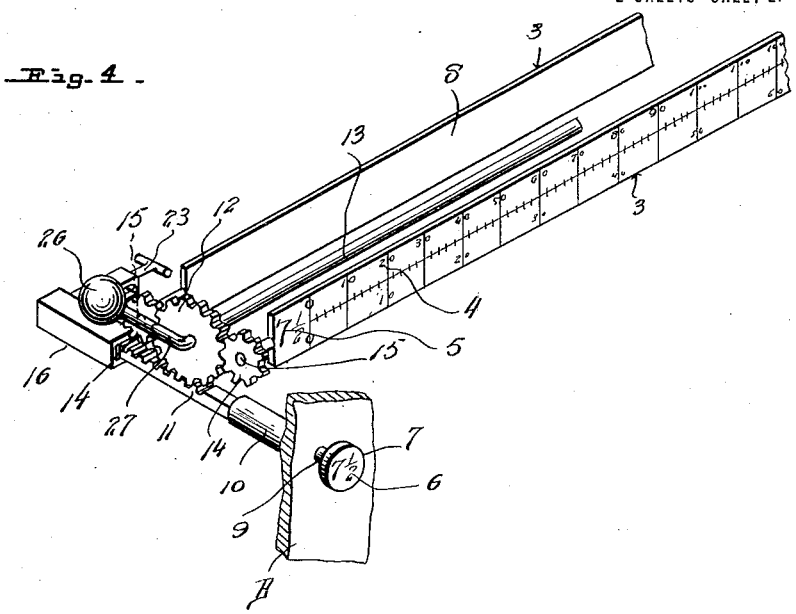
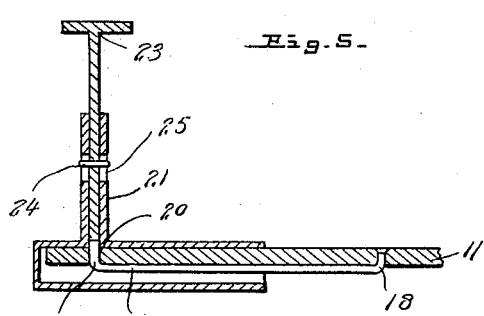
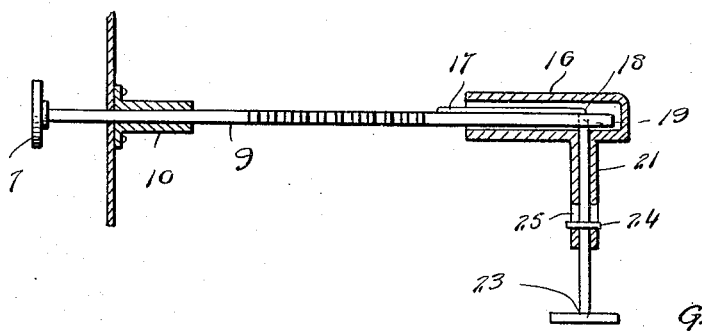

UNITED STATES PATENT OFFICE.

GEORGE R. KREBS AND JAMES W. MORGAN, OF CHARLESTON, WEST VIRGINIA, ASSIGNORS OF ONE-THIRD TO PATRICK T. BOARD, OF CHARLESTON, WEST VIRGINIA.

COMPUTING-SCALE.

1,148,100.      Specification of Letters Patent.      Patented July 27, 1915.

Application filed November 23, 1914. Serial No. 873,625.

*To all whom it may concern:*

Be it known that we, GEORGE R. KREBS and JAMES W. MORGAN, citizens of the United States, residing at Charleston, in the county of Kanawha, State of West Virginia, have invented certain new and useful Improvements in Computing-Scales; and we do hereby declare the following to be a full, clear, and exact description of the invention, such as will enable others skilled in the art to which it appertains to make and use the same.

This invention relates to certain novel and useful improvements in computing scales and is particularly applicable to computing scales of the type having fan-shaped dials located in a housing or casing at the upper portion of the scale, these dials being adapted to be traversed by slotted swinging indicator hands moving over the faces of the dials.

It is our purpose to provide a computing scale having two dials, which will indicate to the customer, as well as the merchant, the value in dollars and cents and the weight in pounds and ounces of the article or goods being sold.

Still a further object of the invention is the provision of a dial composed of a plurality of assembled, independently movable sections, each section having figures or price indications marked on one side thereof, the other side of each section being blank, so that when a particular sale or transaction is in progress, only those figures applicable to the particular transaction will be exposed to view, the remainder of the scale dial being blank, by reason of the blank surfaces of the sections not in use being presented to the observers.

Still a further object of our invention is to provide a dial for computing scales wherein only those figures which are applicable to a particular transaction in the course of progress will be exposed, thus eliminating the possibility of error in reading the wrong figures on a dial, such as in common use in scales of this type, that is to say a dial wherein all the figures on the dial surface are at all times exposed to view.

Another object of the invention is the provision of a dial for computing scales wherein the amount of the purchase may be ascertained at a glance, thereby accomplishing a saving of time in the study of the dial.

A further object of our invention is the provision of a dial for computing scales embodying the desired features of simplicity, efficiency, reliability and convenience, and which may be manufactured and marketed at a relatively low cost.

With the above recited objects and others of a similar nature in view, our invention consists in the construction, combination and arrangement of parts set forth in and falling within the scope of the appended claims.

In the accompanying drawings: Figure 1 is a view in front elevation of a scale of the type to which our invention is applicable. Fig. 2 is a vertical sectional view taken on the line 2—2 of Fig. 1. Fig. 3 is a view in front elevation of a portion of a scale dial with the front of the casing removed and showing the manner of mounting the sections of the dial. Fig. 4 is a detail perspective view of a pair of sections of the duplex dial and showing the mechanism for operating the same. Fig. 5 is a horizontal sectional view taken on the line 5—5 of Fig. 4. Fig. 6 is a sectional view taken on the line 6—6 of Fig. 1.

Referring now to the accompanying drawings in detail, the letter A designates conventionally a scale of the character to which our invention is applicable, while B is the flared or fan-shaped casing and C is the weighing pan or platform.

It is to be understood that our scale dial is what might be termed a duplex dial, that is to say embraces a front chart F and a rear chart R, these charts being duplicates one of another, so that when a transaction is in progress the merchant may read the front chart, for instance, while the results thereon will also be indicated on the rear chart and may be read by the customer. Over the front chart sweeps the usual slotted indicator hand 1, while a similar hand 2 sweeps over the rear chart R. Each chart is made up of a series of slats or bars 3, and one side face of each slat or bar has a scale of figures, indicated at 4, imposed thereon, these figures indicating the amounts in dollars and cents, or valuation, at the rate or selling price indicated by the large figure marked 5, and appearing on one end of the slat or bar, this figure 5 corresponding to the price per pound of the figure shown at 6 on the head of the push button 7. The other face of each bar 3 is blank as indicated at 8, and it is to be understood that when the scale is not in use only the blank faces of the slats are exposed to view. Now, in the operation of the scale it is intended that when an article to be weighed and computed as to value, is placed upon the scale pan C, the merchant shall press one of the buttons 7 having marked on its face the character indicating the price per pound of the article, and when this push button is operated, that slat or bar of the scale dial corresponding to this button will be turned to expose the price scale thereon to view, the remaining slats of the scale dial, of course, presenting their blank faces. This operation is accomplished as follows: Each push button 7 is attached to that end of a shaft 9 which projects through the front wall or covered frame of the casing B, a guide sleeve 10 through which this shaft 9 passes extending inward from the casing wall or frame. Each shaft 9 has its upper longitudinal edge formed with a toothed rack 11 which meshes with a relatively large gear wheel 12 loosely mounted on the shaft 13. This gear wheel 12 in turn meshes with the toothed pinions 14 fast on the studs 15 projecting from the slats or bars 3 of the front and rear charts so that corresponding or companion slats or bars of the front and rear charts may be simultaneously operated. The rear end of each shaft 9 slides in a small boxing 16 which projects beyond the rear wall of the casing B, and the rear end of this shaft 9 has a spring rod 17 attached thereto at one end as at 18, this spring rod extending alongside the rear portion of the shaft 9 and has its opposite end bent at an angle to form a lateral extension 19 which is normally projected through the transverse aperture 20, near the rear end of the shaft 11 so that the end of this lateral extension 19 may enter the sleeve 21 extending from one side of the boxing, so that when the shaft 9 is pushed inward of the boxing by pressing upon the push button the lateral extension 19 may be snapped into the sleeve 21 and lock the shaft against retractive or outward movement. Sliding within the sleeve 21 is the shank 22 of the release trigger 33, the shank of the trigger being limited in its sliding movement in the sleeve by a cross pinion 24 moving in the elongated slots 25 formed in the walls of the sleeve. Now, in scales of this character, when the weighing operation has been completed, the act of lifting the article off the scale pan causes the indicator hands to sweep or swing back to their normal positions at zero, and in our improved scales this backward movement or returning to zero of the indicator hands is intended to release the shaft 9 from its locked position as shown in Fig. 5, and permit the shaft with its push button to move outward to its normal inoperative position ready for the next operation. In accomplishing this actuation of the release trigger, the adjacent indicator arm, or the indicator arm at the rear of the scale in swinging back to its zero position strikes the head of the trigger 23 and pushes the shank of the trigger inward in the sleeve until such inward movement of the shank is limited by the cross pin 24 striking the inner ends of the slats. This inward movement of the shank 22 of the trigger causes the inner end of the shank to strike the end of the lateral extension 19 and push the latter out of the sleeve and inward of the boxing 16, this inward movement of the spring arm being permitted owing to its resiliency. Upon the release of this arm 17 from such locking engagement, the shaft 9 is moved outward by means of the weight 26 carried at the end of the arm 27 which is formed by binding laterally the end of the shaft 16. This arm, of course, normally hangs substantially downward owing to the force of gravity, and it will be noted that when the push button is pressed to move the shaft 9 inward, the turning of the gear wheel 12 will rock this weighted arm upward toward an approximately horizontal position, and it will be held in this position so long as the shaft is locked. When, however, this shaft is released the weight of the end of the arm will swing the latter downward reversing the direction of the movement of the gear 12 and consequently pushing the shaft 19 downward so that the button resumes its normal position. It will be further understood that when a button is pressed inward only those slats or bars which are connected through a train of gearing with the shaft of such button will be turned to expose the price scales thereon, the remaining slats remaining stationary with their blank faces exposed. In this connection it will be further understood that we employ a series of push buttons or keys, one for each pair of slats or bars 3, constituting part of the front and rear charts.

By the arrangement herein described, it will be evident when the scale is not in use the entire surface of the dial on each side of the scale will be blank, while the row of push buttons or keys will be standing out in the position shown in the lower portion of Fig. 4, and that when one of these keys is pushed in, the particular dial slat or section desired will turn to show the amount or value of the purchase of the selling price of the commodity upon the scale through the slots of the pointer or indicator arm on each side of the scale, while the pointer or indicator at its upper extremity will show the weight per pound on the graduated scale $p$. Furthermore, it will be noted that as soon as the article being weighed is removed from the scale the pointer or indicator arm will return to zero, and in doing so will manipulate the trigger as before described to permit the release of the key or button shaft and consequently the restoration of the parts to normal inoperative position ready for the next transaction.

While we have herein shown and described one particular embodiment of our invention we wish it to be understood that we do not confine ourselves to all the precise details of construction herein set forth by way of illustration, as modification and variation may be made without departing from the spirit of the invention or exceeding the scope of the appended claims.

What we claim is:

1. In a computing scale, the combination with a dial frame, of a dial comprising a series of sections, each section having valuation figures marked on one side thereof, the opposite side of each section being blank with the blank sides of all the sections exposed when the scale is not in operation, and mechanism for each section of the dial, and adapted when operated to turn such section to expose the numerals on the face thereof.

2. In a computing scale, the combination with a dial and a traveling indicator hand, of a scale dial formed of a series of individual slats, each slat having one side marked with valuation figures, the opposite side of each slat being blank, the blank sides of all the slats being exposed to present a blank face for the entire dial when the scale is not in use, means for each individual slat for turning such slat at desired times to expose the figured face thereof, means for locking said slat with the figured face exposed and means adapted to be operated by the indicator hand to release the slat and permit the latter to turn to return to normal position.

3. In a computing scale, the combination with a scale dial frame and a traveling indicator hand sweeping thereover, of a dial frame, of a series of slats, each slat having a graduated scale of valuation figures on one face thereof, the opposite face of the slat being blank, the blank faces of all the slats being exposed when the scale is in inoperative position, means including a push button, a reciprocating rack bar and gearing between the reciprocating rack bar and the slat for turning each slat when the push button is actuated to expose the graduated scale face of the slat, means for locking the rack bar in position to hold the graduated scale of the face exposed and means operated by the movement of the indicator hand in one direction to release the rack bar and permit the slat to return to its normal position with the blank face exposed.

In testimony whereof, we affix our signatures, in the presence of two witnesses.

GEORGE R. KREBS.
JAMES W. MORGAN.

Witnesses:
  C. E. KREBS,
  R. E. PAYNE.

Copies of this patent may be obtained for five cents each, by addressing the " Commissioner of Patents, Washington, D. C."